(12) United States Patent
Tsang et al.

(10) Patent No.: US 10,193,607 B2
(45) Date of Patent: Jan. 29, 2019

(54) DETERMINING A SOUNDING INTERVAL BASED ON THROUGHPUT

(71) Applicant: ARRIS Enterprises LLC, Suwanee, GA (US)

(72) Inventors: Yui Ming Tsang, Sunnyvale, CA (US); Sandip C. Patel, Sunnyvale, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/758,726

(22) PCT Filed: Dec. 30, 2015

(86) PCT No.: PCT/US2015/068184
§ 371 (c)(1),
(2) Date: Mar. 9, 2018

(87) PCT Pub. No.: WO2017/044145
PCT Pub. Date: Mar. 16, 2017

(65) Prior Publication Data
US 2018/0262249 A1 Sep. 13, 2018

Related U.S. Application Data

(60) Provisional application No. 62/215,981, filed on Sep. 9, 2015.

(51) Int. Cl.
*H04B 7/06* (2006.01)
*H04L 25/02* (2006.01)

(52) U.S. Cl.
CPC ......... *H04B 7/0617* (2013.01); *H04B 7/0626* (2013.01); *H04L 25/0224* (2013.01)

(58) Field of Classification Search
CPC ... H04L 25/021; H04L 25/0222; H04L 25/02; H04L 25/0224; H04B 7/0626; H04B 7/0617
See application file for complete search history.

(56) References Cited

U.S. PATENT DOCUMENTS 6,765,969 B1 * 7/2004 Vook .................. H04L 1/06
375/259
2002/0119796 A1 * 8/2002 Vanghi ............... H04W 28/08
455/522

(Continued)

FOREIGN PATENT DOCUMENTS

WO WO 2014-031050 2/2014

OTHER PUBLICATIONS

International Search Report, PCT/US2015/068184, dated Jul. 29, 2016.
Written Opinion, PCT/US2015/068184, dated Jul. 29, 2016.

*Primary Examiner* — Jean B Corrielus
(74) *Attorney, Agent, or Firm* — Stewart M. Wiener; Steven E. Stupp (57) ABSTRACT

In order to determine a sounding interval, an electronic device iteratively revises a set of potential sounding intervals based on transmission statistics associated with communication of some packets with and other packets without transmission beamforming for the set of potential sounding intervals. In particular, the electronic device calculates rank positions for the set of potential sounding intervals based on an estimated throughput and numbers of packets transmitted with transmission beamforming for the set of potential sounding intervals out of a total number of packets transmitted. Then, the electronic device may determine the output sounding interval based on the ranking. When the convergence criterion is achieved, the electronic device may determine a moment based on calculated frequencies of the rank positions over multiple iterations, which is used to revise the set of potential sounding intervals in the next iteration.

20 Claims, 6 Drawing Sheets

(56) References Cited

U.S. PATENT DOCUMENTS

| | | |
|---|---|---|
| 2007/0071147 A1 | 3/2007 | Sampath ................. 375/347 |
| 2009/0213750 A1 | 8/2009 | Gorokhov ............... 370/253 |
| 2013/0028102 A1 | 1/2013 | Vitthaladevuni ......... 370/252 |
| 2013/0039319 A1* | 2/2013 | Shi ................. H04L 5/0023 |
| | | 370/329 |
| 2014/0086349 A1 | 3/2014 | Landau et al. .......... 375/260 |

* cited by examiner

DETERMINING A SOUNDING INTERVAL BASED ON THROUGHPUT

CROSS REFERENCE TO RELATED APPLICATIONS

This application claims priority under 35 U.S.C. 371 to International Patent Application No. PCT/US15/68184, "Determining a Sounding Interval Based on Throughput," by Yui Ming Tsang et al., filed on Dec. 30, 2015, which claims priority to U.S. Provisional Patent Application No. 62/215,981, "Determining a Sounding Interval Based on Throughput," by Yui Ming Tsang et al., filed on Sep. 9, 2015, the contents of both of which are herein incorporated by reference.

BACKGROUND

Field

The described embodiments relate to techniques for wirelessly communicating information among electronic devices, including determining a sounding interval for updating transmission beamforming and antenna patterns for wireless communication.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

In order to improve performance during wireless communication among electronic devices, many electronic devices include multiple antennas that can use beamforming techniques to provide transmission beamforming. When configured properly, the transmission beamforming can address the performance challenges in an environment, such as with a multi-path communication channel.

Because the environment of an electronic device can change, it is often necessary to update the transmission beamforming. The transmission beamforming is usually determined regularly, such as after a time interval (which is referred to as a 'sounding interval') has elapsed.

However, the choice of the sounding interval represents a tradeoff A short sounding interval can provide transmission beamforming that is a good match for the environment (and, thus, may result in a high value of the signal-to-noise ratio) at the cost of more overhead. Alternatively, a long sounding interval can reduce the overhead, but may result in transmission beamforming that is less optimal for the environment (and, thus, may result in a lower value of the signal-to-noise ratio). The difficulty in selecting the sounding interval and the changes in the environment can degrade the performance of the communication.

SUMMARY

The described embodiments relate to an electronic device that determines a sounding interval. This electronic device includes: an interface circuit that, during operation, communicates with one or more other electronic devices; a processor; and memory that stores a program module which, during operation, is executed by the processor. During operation, the electronic device initializes a set of potential sounding intervals, where a given potential sounding interval specifies how often transmission beamforming is updated using sounding packets. Then, the electronic device communicates, to at least another electronic devices, some packets with and other packets without transmission beamforming for the set of potential sounding intervals. During this communication, the electronic device also updates an antenna pattern. In response, the electronic device receives transmission statistics for communication with the one or more other electronic devices.

The electronic device also calculates rank positions for the set of potential sounding intervals based on a performance metric (such as an estimated throughput), which is determined from the transmission statistics and numbers of packets transmitted with transmission beamforming for the set of potential sounding intervals out of a total number of packets transmitted. Based on the ranking, an output sounding interval is determined. Next, the electronic device repeats the communicating, receiving, and calculating, and calculates frequencies of the ranking positions over the iterations and determines the output sounding interval until a convergence criterion is achieved. When the convergence criterion is achieved, the electronic device determines a moment based on the calculated frequencies, and revises the set of potential sounding intervals based on the determined moment. Furthermore, the electronic device repeats, one or more times, the communicating, receiving, calculating the rank positions, determining the output sounding interval, calculating the frequencies, and determining the moment based on the revised set of potential sounding intervals.

In some embodiments, the electronic device excludes errors in the transmission statistics that are associated with effects other than transmission beamforming. Note that the transmission statistics may include one or more of: transmission errors associated with noise, transmission errors associated with collisions and interference, and transmission errors associated with the antenna pattern.

Moreover, the transmission statistics may include at least two of: the total number of packets transmitted, the number of packets transmitted using transmission beamforming, and a number of packets transmitted without using transmission beamforming.

Furthermore, the moment may include a mean and/or a median.

Additionally, the electronic device may include an antenna with multiple elements that, during operation, provides the antenna pattern.

Note that the electronic device may include one of: an access point, and a cellular telephone.

In some embodiments, some or all of the aforementioned operations performed by the electronic device are implemented in hardware instead of the program module.

Another embodiment provides a computer-program product for use with the electronic device. This computer-program product includes instructions for at least some of the operations performed by the electronic device.

Another embodiment provides a method. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects,

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to determine a sounding interval, an electronic device may iteratively revise a set of potential sounding intervals (which specify how often transmission beamforming is updated using sounding packets) based on transmission statistics associated with communication of some packets with and other packets without transmission beamforming for the set of potential sounding intervals. In particular, the electronic device may calculate rank positions for the set of potential sounding intervals based on a performance metric (such as an estimated throughput), which is determined from the transmission statistics, and numbers of packets transmitted with transmission beamforming for the set of potential sounding intervals out of a total number of packets transmitted. (Note that while optimizing the sounding interval, the electronic device may also update an antenna pattern of the electronic device.) Then, the electronic device may determine the output sounding interval based on the ranking. When the convergence criterion is achieved, the electronic device may determine a moment based on the calculated frequencies of the rank positions, which is used to revise the set of potential sounding intervals in the next iteration.

This communication technique may allow the electronic device to dynamically determine the largest sounding interval that represents an optimal tradeoff between overhead and the signal-to-noise ratio. Moreover, the electronic device may be able to dynamically adapt to changes in a wireless environment, thereby providing improved communication performance. Consequently, the communication technique may improve the user experience when using the electronic device.

In the discussion that follows, the electronic device may include a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used.

Figure 1:
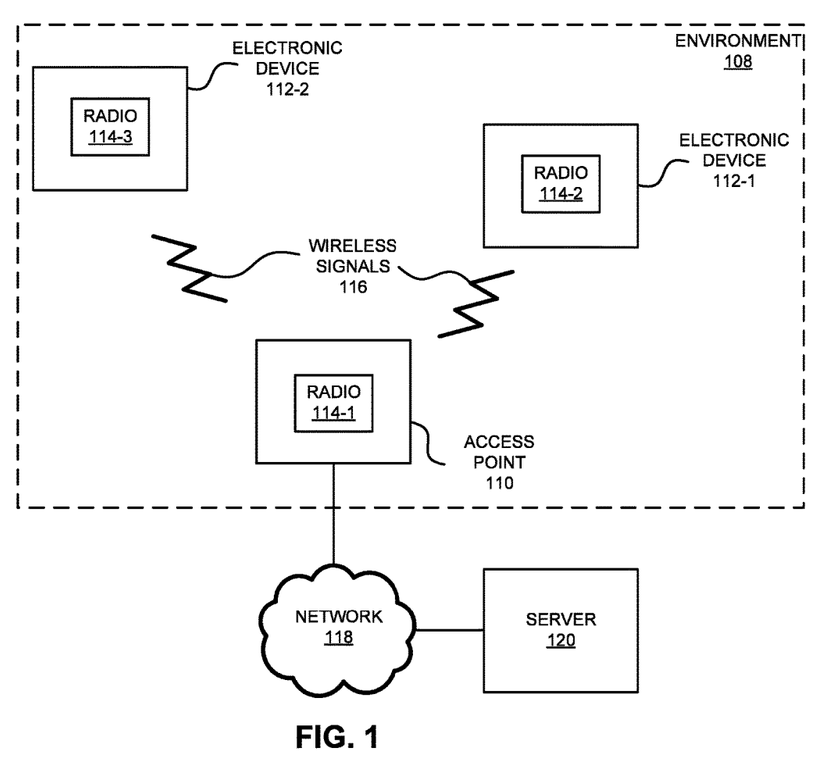
FIG. 1 is a block diagram illustrating electronic devices wirelessly communicating in accordance with an embodiment of the present disclosure.

Communication among electronic devices is shown in FIG. 1, which presents a block diagram illustrating an access point 110 and electronic devices 112 (such as a portable electronic device, e.g., a cellular telephone or a smartphone) wirelessly communicating in an environment 108 according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 6:
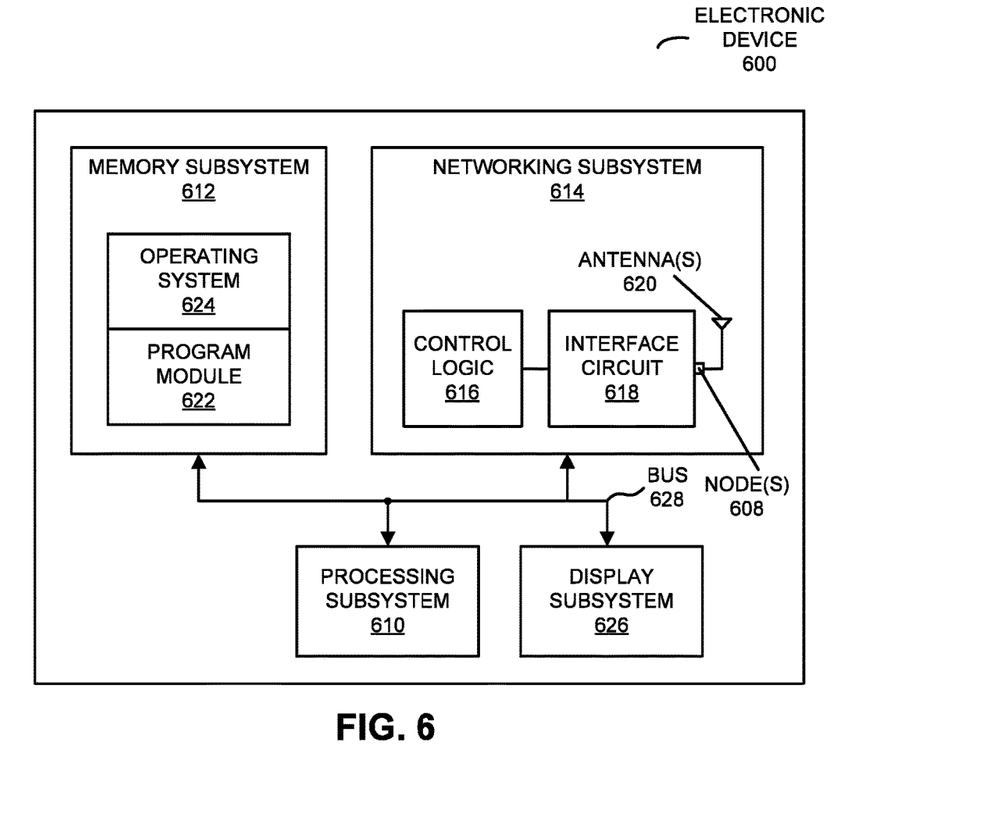
FIG. 6 is a block diagram illustrating an electronic device in accordance with an embodiment of the present disclosure.

As described further below with reference to FIG. 6, access point 110 and electronic devices 112 may include subsystems, such as a networking subsystem, a memory subsystem and a processor subsystem. In addition, access point 110 and electronic devices 112 may include radios 114 in the networking subsystems. More generally, access point 110 and electronic devices 112 can include (or can be included within) any electronic devices with the networking subsystems that enable access point 110 and electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 114 are shown in access point 110 and electronic devices 112, one or more of these instances may be different from the other instances of radios 114.

As can be seen in FIG. 1, wireless signals 116 (represented by jagged lines) are transmitted from radio 114-1 in access point 110. These wireless signals 116 may be received by radios 114 in one or more of the other electronic devices 112 (such as electronic device 112-1). In particular, access point 110 may transmit packets. In turn, these packets may be received by the one or more of electronic devices 112. Moreover, access point 110 may allow electronic devices 112 to communicate with other electronic devices, computers and/or servers (such as server 120) via network 118.

Note that the communication between access point 110, electronic device 112-1 and/or electronic device 112-2 may be characterized by a variety of performance metrics, such as: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
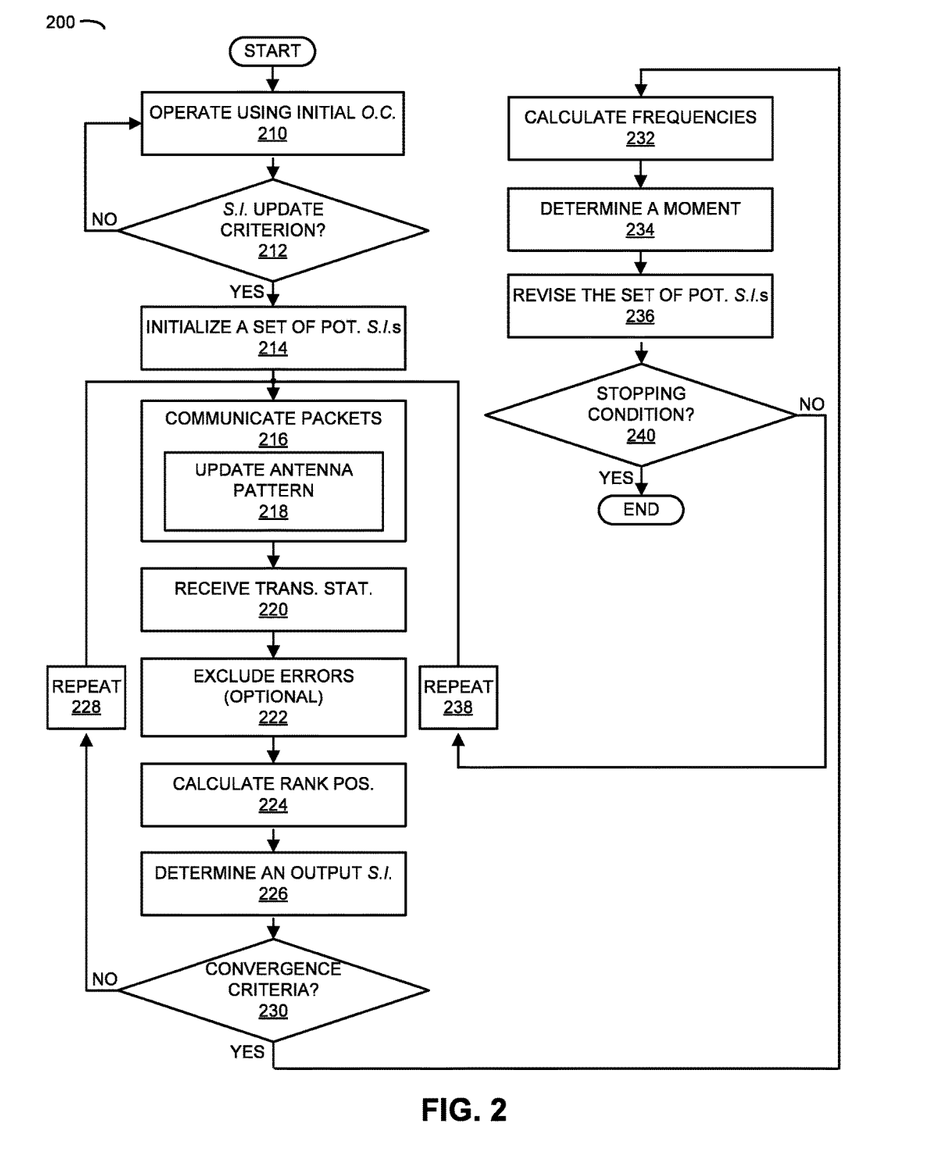
FIG. 2 is a flow diagram illustrating a method for determining a sounding interval in accordance with an embodiment of the present disclosure.

As discussed further below with reference to FIGS. 2-4, in the disclosed communication technique, an interface circuit in an electronic device (such as access point 110) may provide sounding packets to one or more electronic devices (such as one or more of electronic devices 112) based on a sounding interval. Moreover, access point 110 may receive beamforming information (such as transmission-beamforming information) in response to the sounding packets (e.g., from electronic device 112-1, such as sounding feedback, which is sometimes referred to as 'compressed beamforming feedback' or CBF, or 'channel-state information' or CSI), and/or may calculate beam-pattern settings (which is sometimes referred to as an 'antenna pattern') for a set of antennas or for elements in an antenna (which are considered equivalent in the present discussion). For example, access point 110 may determine amplitudes or weights and phases for signals to the set of antennas in access point 110 that provide transmission beamforming (such as via a matrix calculation that determines a steering vector). This transmission beamforming may, on an electronic device-specific basis, attenuate and/or rotate an antenna pattern of access point 110. Alternatively or additionally, the antenna pattern may be adapted or changed using pattern shapers (such as reflectors) in an antenna or an antenna element in access point 110, which can be independently and selectively electrically coupled to ground to steer the antenna radiation pattern in different directions. Note that the antenna pattern (such as a transmit antenna pattern and/or a receive antenna pattern for use when communicating with a particular electronic device, such as electronic device 112-1) may be characterized by a spatially varying intensity, with beams (or local maxima in the intensity) at certain locations or regions, and exclusion zones (with local minima in the intensity, e.g., locations or regions having an intensity less than a predefined value) at other locations or regions.

Access point 110 may perform a communication technique to regularly determine or adjust the sounding interval that specifies when or how often the transmission beamforming and/or the antenna pattern are updated. In particular, the communication technique may determine the sounding interval based on an estimated throughput (and, more generally, one or more performance metrics associated with communication between access point 110 and electronic device 112-1). For example, the sounding interval may be selected to maximize the estimated throughput. Note that the estimated throughput may be determined based on the physical data rate and the number of packets transmitted.

This communication technique may allow access point 110 to adapt to changes in its environment and/or changes associated with motion of electronic devices 112 (such as electronic device 112-1). Moreover, the communication technique may reduce the overhead associated with transmission of sounding packets. Note that such sounding overhead can become dominant when the number of electronic devices in a network increases, because the number of packets transmitted per electronic device decreases.

In general, the sounding interval is a continuous quantity. The communication technique may provide an approach for obtaining the sounding interval at very high precision, but with very low cost. The communication technique may also provide an approach for detecting inaccurate sounding results to enhance the system stability. Furthermore, the communication technique may be applied to a wide variety of different types of transmission beamforming, such as:

single-user transmission beamforming (Su-TxBF) and a multi-user, multi-input-multi output system (Mu-MIMO) in which the transmission beamforming is also performed on a frequency or carrier-specific basis.

In the described embodiments, processing a packet or frame in access point 110 and/or electronic devices 112 includes: receiving wireless signals 116 with the packet or frame; decoding/extracting the packet or frame from received wireless signals 116 to acquire the packet or frame; and processing the packet or frame to determine information contained in the packet or frame (such as feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. While FIG. 1 illustrates access point 110 performing the communication technique, in some embodiments the communication technique is performed by one of electronic devices 112, such as electronic device 112-1.

We now describe embodiments of the method. FIG. 2 is a flow diagram illustrating a method 200 for determining a sounding interval in accordance with some embodiments, which may be performed by an electronic device (such as access point 110 or, in other embodiments, one of electronic devices 112 in FIG. 1). During operation, the electronic device operates with an initial operating condition or O.C. (operation 210), where the initial operating condition includes a sounding interval for updating transmission beamforming during communication with another electronic device and an antenna pattern used when communicating with the other electronic device (such as when transmitting packets to and/or receiving packets from the other electronic device).

When a sounding-interval (Si) update criterion (which is sometimes referred to as a 'triggering event') is met (operation 212), the electronic device initializes a set of potential sounding intervals (operation 214), where a given potential sounding interval specifies how often transmission beamforming is updated using sounding packets. Then, the electronic device communicates, to at least one or more of the other electronic devices, some packets with and other packets without transmission beamforming (operation 216) for the set of potential sounding intervals. (Thus, not every packet is sent with and without transmission beamforming. Indeed, a given packet may be set using transmission beamforming or without transmission beamforming, i.e., one or the other. Moreover, the number of packets sent with and the number of packets sent without transmission beamforming may be different for different potential sounding intervals.) During the communication (operation 216), the electronic device also updates an antenna pattern (operation 218). For example, the electronic device may transmit some packets using transmission beamforming at different sounding intervals and with different antenna patterns, and may transmit other packets without using transmission beamforming at the different sounding intervals and with the different antenna patterns. In response, the electronic device receives transmission statistics (operation 220) for communication with the one or more other electronic devices.

Moreover, the electronic device calculates rank positions (operation 224) for the set of potential sounding intervals based on a performance metric (such as an estimated throughput), which is determined from the transmission statistics and numbers of packets transmitted with transmission beamforming for the set of potential sounding intervals out of a total number of packets transmitted.

Based on the calculated ranking (operation 224), the electronic device determines an output sounding interval (operation 226). Next, the electronic device repeats (operation 228) the communicating (operation 216), updating (operation 218), receiving (operation 220), and calculating the ranking positions (operation 224), and determines the output sounding interval (operation 226) until one or more convergence criteria are achieved (operation 230). For example, one of the convergence criteria may be that a difference in the output sounding interval determined in two or more instances of the repeating (operation 226) is less than 1, 3, 5 or 10%. Another non-limiting example criterion is that the confidence internal on the throughput measurement crosses a selected threshold (e.g., 95%).

When the one or more convergence criteria are achieved (operation 230), the electronic device calculates frequencies (operation 232) of the ranking positions over the iterations and determines a moment (operation 234) based on the calculated frequencies, and revises the set of potential sounding intervals (operation 236) based on the determined moment. For example, the moment may include a mean and/or a median.

Furthermore, the electronic device repeats (operation 238), one or more times, the communicating (operation 216), updating (operation 218), receiving (operation 220), calculating (operation 224), determining (operation 226), calculating (operation 232), and determining (operation 234) based on the revised set of potential sounding intervals. Method 200 may repeat (operation 238) until a stopping condition (operation 240) is achieved. For example, the stopping condition (operation 240) can be: a predetermined number of iterations are performed (such as 10, 50 or 100 iterations), a difference in the output sounding interval determined in two or more instances of the repeating (operation 238) is less than 1, 3, 5 or 10% and/or an external signal to stop the recursion. In some embodiments, the stopping condition (operation 240) is a confidence interval (based on an integrated probability distribution function) of at least 75%.

In some embodiments, the electronic device optionally excludes errors (operation 222) in the transmission statistics that are associated with effects other than transmission beamforming. This is because, in general, transmission beamforming may work best in a clean radio-frequency environment. Note that the transmission statistics may include one or more of: transmission errors associated with noise, transmission errors associated with collisions and interference, and transmission errors associated with the antenna pattern.

Moreover, the transmission statistics may include at least two of: the total number of packets transmitted, the number of packets transmitted using transmission beamforming, and a number of packets transmitted without using transmission beamforming.

Additionally, the electronic device may include an antenna with multiple elements that, during operation, provides the antenna pattern.

Note that the electronic device may include one of: an access point, and a cellular telephone.

In some embodiments of method 200, there may be additional or fewer operations. Moreover, the order of the operations may be changed, and/or two or more operations may be combined into a single operation.

Figure 3:
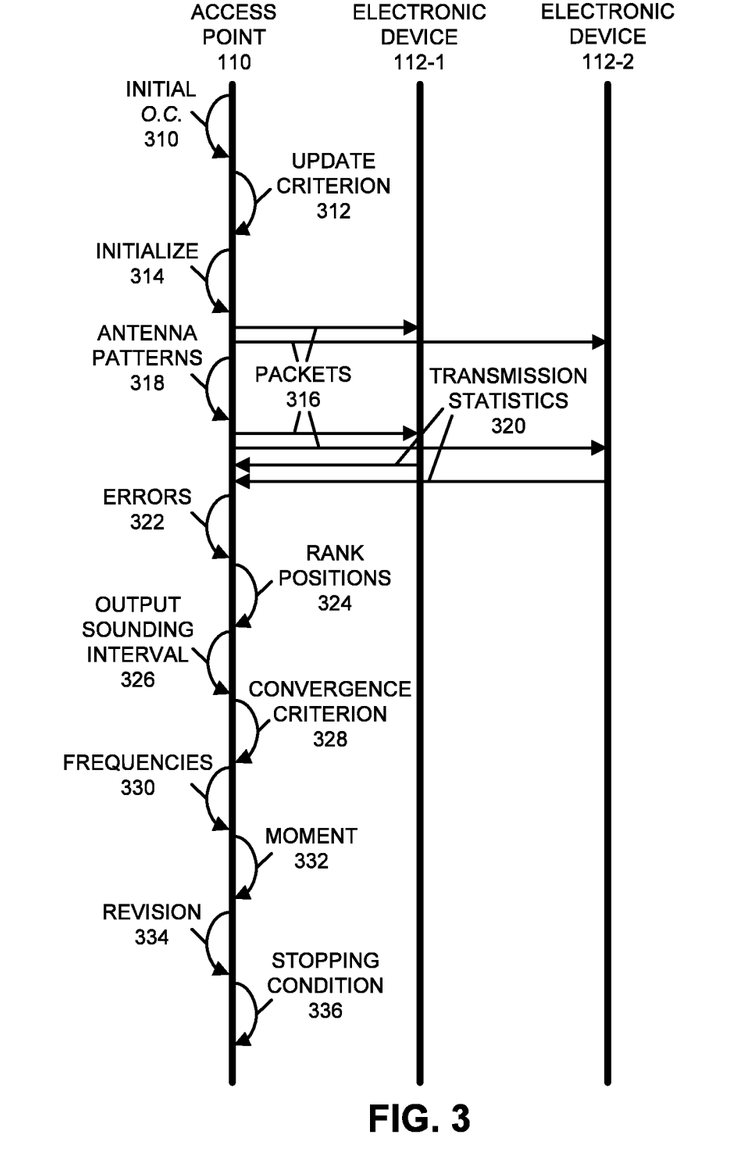
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication among access point 110, electronic device 112-1 and/or electronic device 112-2 according to some embodiments. In particular, access point 110 may have an initial operating condition (O.C.) 310, where the initial operating condition includes a sounding interval for updating transmission beamforming during communication with another electronic device and an antenna pattern used when communicating with the other electronic device.

When a sounding-interval (Si) update criterion 312 is met (i.e., the triggering event), access point 110 may initialize 314 a set of potential sounding intervals. Then, access point 110 may communicate, to electronic device 112-1 and/or electronic device 112-2, packets 316 for the set of potential sounding intervals, where some of packets 316 use and another portion of packets 316 do not use transmission beamforming. During this communication, access point 110 may update one or more antenna patterns 318 used with electronic devices 112-1 and 112-2. (Note that a given antenna pattern in antenna patterns 318 may be associated with one or more electronic devices, such as electronic device 112-1.) In response, access point 110 may receive transmission statistics 320 for the communication with electronic device 112-1 and/or electronic device 112-2. In some embodiments, access point 110 optionally excludes errors 322 in transmission statistics 320 that are associated with effects other than transmission beamforming.

Moreover, access point 110 may calculate rank positions 324 for the set of potential sounding intervals based on a performance metric (such as an estimated throughput), which is determined from transmission statistics 320, and numbers of packets transmitted with transmission beamforming for the set of potential sounding intervals out of a total number of packets transmitted.

Based on the calculated rank positions 324, access point 110 may determine an output sounding interval 326. Next, access point 110 may repeat the communicating of instances of packets 316, updating the one or more antenna patterns 318, receiving instances of transmission statistics 320, calculating instances of rank positions 324 and determining instances of the output sounding interval 326 until a convergence criterion 328 is achieved.

When convergence criterion 328 is achieved, access point 110 may calculate frequencies 330 (or probabilities) of rank positions 324 over the iterations and may determine a moment 332 based on the calculated frequencies 330. Moreover, access point 110 may revise 334 the set of potential sounding intervals based on the determined moment 332.

Furthermore, access point 110 may repeat, one or more times, the communicating of instances of packets 316, updating the one or more antenna patterns 318, receiving instances of transmission statistics 320, calculating instances of rank positions 324, determining instances of the output sounding interval 326, calculating frequencies 330, and determining instances of moment 332 based on the revised 334 set of potential sounding intervals until a stopping condition 336 is achieved.

We now describe an exemplary embodiment of the communication technique. In the discussion that follows, transmission beamforming (TxBF) should be understood to be a technique employed in a wireless communication system to combine the signal energy to a desired direction to improve the link quality of a wireless link and reduce its interfering power to undesired direction(s). Moreover, Su-TxBF is a TxBF technique used when data is only destined to one station (or receiver). Furthermore, Mu-MIMO is a TxBF technique used when data is destined to more than one station (or receiver) at the same time, and the data can be different across stations, which is in contrast with a packet broadcast technique.

In order to enable TxBF, CSI of the channel between a transmitter (Tx) and receiver (Rx) may be needed. CSI may include a set of channel attenuations and phases between each transmit and receive antenna pair for each frequency subcarrier. The CSI can be obtained implicitly if the uplink and downlink are symmetric or explicitly when it is fed back from the receiver. If the CSI is obtained implicitly, it is called 'implicit sounding,' while if the CSI is obtained explicitly, it is called 'explicit sounding.' Additionally, a sounding request may be generated by the transmitter to inform the parties of interest of its need for the most-updated CSI. If the sounding request is translated to particular sounding packets (such as a null data packet or NDP in an IEEE 802.11standard) as in explicit sounding, the party of interest is the receiver of the link. However, if implicit sounding is employed, the party of interest may be the transmitter itself.

Finally, note that a sounding interval may be defined as the time duration or time interval between two sounding requests.

As noted previously, requesting sounding incurs communication overhead as well as processing overhead. In explicit sounding, a sounding packet is sent from the transmitter and a CSI feedback packet is sent from the receiver. This typically incurs significant communication cost. On the other hand, in implicit sounding, some digital processing may be needed to form the CSI, which can consume power and introduce delay to the system.

In the discussion that follows, explicit sounding is used as an illustrative example. However, the communication technique may also be applied or used in the case of implicit sounding.

In general, the sounding interval may have three impacts on the throughput. First, a shorter sounding interval may incur more communication overhead. For a system with a large number of stations, each station may only transmit a handful of packets within a sounding interval. In this case, the communication overhead can become a major concern. Second, a long sounding interval may introduce more packet errors. For example, the CSI can become outdated, and thus may be invalid for TxBF transmission. A packet transmission using a TxBF technique based on invalid CSI may result in packet errors, which will lower the throughput. Third, a wireless communication channel is uncertain in nature. The uncertainty can be due to the noise in the channel, variations in the capabilities of the transmitters and receivers, as well as many other random factors (such as collisions and/or interference in the network). In light of such uncertainty, a sounding result (such as the CSI) may not be accurate, which may result in: a higher-packet error rate; and/or bias in transmission statistics, which can mislead subsequent optimization. By using the communication technique, the electronic device may avoid or reduce adverse effects associated with incorrect CSI.

In an exemplary embodiment of the communication technique, throughput (i.e., a data rate for successful communication) is used, at least in part, as a driving variable for determining the sounding interval for the electronic device. In general, throughput may provide an aggregated performance metric for the effects of various factors that may be impacted by varying sounding intervals, and may average out the effects that do not originate from different sounding intervals (and, thus, may be suitable for use with wireless-communication environments that are not very predictable). However, a wide variety of performance metrics may be used when determining the sounding interval, including: the RSS, the data rate, the error rate (such as the retry or resend rate, or the packet error rate), the mean-square error of equalized signals relative to an equalization target, intersymbol interference, multipath interference, the signal-to-noise ratio, the width of an eye pattern, the ratio of number of bytes successfully communicated during a time interval (such as 1-10 s) to the estimated maximum number of bytes that can be communicated in the time interval (i.e., the 'capacity' of a communication channel or link), and/or the ratio of the actual data rate to the estimated data rate (i.e., the 'utilization').

Figure 4:
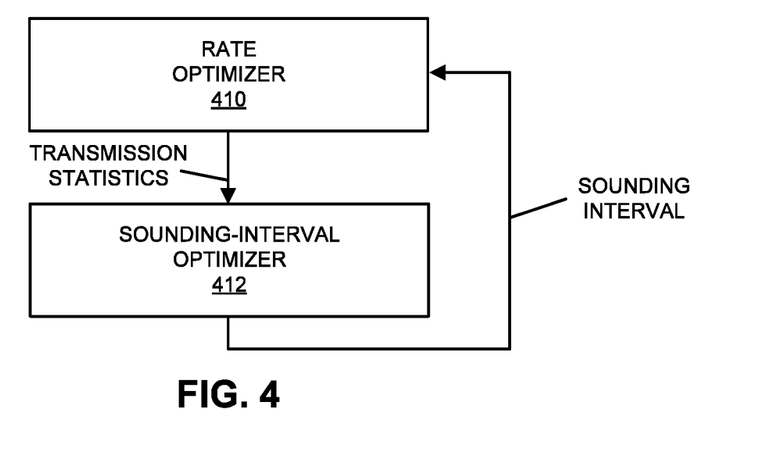
FIG. 4 is a drawing illustrating interdependent optimizers in one of the electronic devices in FIG. 1 in accordance with an embodiment of the present disclosure.

As shown in FIG. 4, which presents a drawing illustrating interdependent optimizers in one of the electronic devices in FIG. 1 in accordance with some embodiments, there may be two interdependent optimizers in the communication technique: a rate optimizer 410, and a sounding-interval optimizer 412. Note that the two interdependent optimizers may be implemented using software and/or hardware.

These optimizers may operate cooperatively and may optimize the outcomes iteratively. In particular, rate optimizer 410 and sounding-interval optimizer 412 may interact with each other as follows. A determined or selected sounding interval may be input into rate optimizer 410. Then, rate optimizer 410 may determine operating parameters that maximize the throughput of the electronic device, such as: the modulation level, the bandwidth used and/or whether or not it should use TxBF for the next packet transmission.

Rate optimizer 410 may conduct a number of trials. Each trial may involve at least one packet transmission. Moreover, rate optimizer 410 may use the feedback from packet transmission to determine whether the chosen operating parameters are suitable.

Then, after a triggering event (such as an elapsed time interval, e.g., 1 s, 5 s, 10 s, 30 s, 1 min, 3 min, etc., or a number of transmitted packets), rate optimizer 410 may generate transmission statistics for the trial results (such as a number of packets transmitted with TxBF selected), and may provide the transmission statistics to sounding-interval optimizer 412.

Sounding-interval optimizer 412 may determine a sounding interval (such as the optimal sounding interval based on the throughput). In particular, sounding-interval optimizer 412 may select a set of basic sounding intervals (which are sometimes referred to as a 'set of potential sounding intervals'), e.g., based on the transmission statistics. For example, the set of basic sounding intervals may include: 1 µs, 25 µs, 100 µs, and 1000 µs.

Next, sounding-interval optimizer 412 may filter out packet-error events due to non-CSI-error events because these events may adversely affect estimates of the sounding interval. Note that, in general, a non-CSI-error event will impact the packet transmission based on TxBF as well as non-TxBF. For example, interference from another link may reduce the signal-to-interference-and-noise ratio (SINR) for an arbitrary transmission. However, the transmission statistics from rate optimizer 410 may average out the non-CSI-error event. One performance metric that can be used is the throughput generated by TxBF transmission versus non-TxBF transmission. Another performance metric that can be used is whether packet transmission in the last or immediately preceding instance of the transmission statistics is favorable in using TxBF (which is sometimes referred to as a 'TxBF favorable measure'), and rate optimizer 410 may attempt to optimize or maximize the TxBF favorable measure. This approach may be advantageous because: the number of transmissions or the duration of the packet transmission may vary in each instance of the transmission statistics (e.g., because of the number of clients in the network and traffic load of the clients); and a suddenly favorable wireless-channel environment may result in a much higher throughput even though TxBF is not used in transmission. Consequently, a normalization technique may be needed across different instances of the transmission statistics.

However, it may be costly and/or difficult to obtain a normalized value for different instances of the transmission statistics if the throughput or another aggregated value is used. For example, one approach for obtaining a normalized value is to determine the total number of packet transmissions or total throughputs in the last several instances of the transmission statistics. This approach may require that the aggregated values from each of the instances of the transmission statistics be stored in memory. Given that a desired sounding interval can be at most several seconds while a packet transmission can take as little as 10 μs, the memory needed may be quite significant.

Using a performance metric that is related to the TxBF favorable measure may be simpler and less costly. In particular, the TxBF favorable measure may include one bit of information from each of the instances of the transmission statistics. Moreover, the TxBF favorable measure may filter out variation in the throughput associated with variations in traffic load and environment.

Thus, for each sounding interval, the electronic device may store or include the number of times TxBF is favorable in the transmission statistics and the total number of instances of the transmission statistics that were received. For example, during a particular transmission, TxBF may be considered 'favorable' if it yields the highest throughput (or the highest estimated throughput) for a given modulation and coding scheme. In contrast, other types of errors (such as those due to noise, collisions or interference) may have similar packet errors rates for TxBF and non-TxBF, and therefore their throughputs are proportional to the modulation and coding scheme used (which can be used by sounding-interval optimizer 412 to filter out packet-error events due to non-CSI-error events).

In some embodiments, a technique such as the binomial confidence interval or the Chernoff bound is used to generalize the probability of TxBF being favorable. However, more generally a wide variety of techniques may be used. In particular, such techniques may be used to extrapolate results to a larger sample size.

When rate optimizer 410 requests a new sounding interval, sounding-interval optimizer 412 may determine or select one based on the generalized performance metric.

Note that the frequency of requests for a new sounding interval can be time-based and/or packet-based. In a time-based approach, the request may be made after a time interval has elapsed (such as 30 s, 1 min, 3 min, 5 min, 10 min, 15 min, 30 min or an hour). Alternatively or additionally, for a packet-based approach, the request may be made after a number of packets have been sent (such as 10, 100, 500 or 1000 packets).

In some embodiments, the recorded numbers used in the communication technique are aged appropriately after some duration (such as 30 s, 1 min, 3 min, 5 min, 10 min, 15 min, 30 min or an hour), so more-recent or fresher measurements are used to determine the sounding interval.

Furthermore, the set of basic sounding intervals may be discrete. However, the precision may not be high enough. In order to increase the precision of the sounding interval, an iterative procedure may be used. In particular, given a set of basic sounding intervals, the electronic device may record or determine the number of times a given basic sounding interval is chosen at each sounding interval requested by rate optimizer 410.

Then, at a triggering event, the electronic device may declare an end of a stage and may calculate the percentage of the time each basic sounding interval was determined. Note that the triggering event can be time-based (such as after a timing threshold or after a time interval has elapsed), input-based (i.e., after a number of inputs, such as a number of sounding intervals) and/or output-based (i.e., after a number of output requests). For example, the time interval may be: 30 s, 1 min, 3 min, 5 min, 10 min, 15 min, 30 min or an hour. Alternatively, the number of inputs or the number of output requests may be: 10, 100, 500 or 1000.

Using this percentage or frequency, the electronic device can calculate a new sounding interval based on a linear combination of the basic sounding intervals in the set of basic sounding intervals and their associated percentages or frequencies. This new sounding interval is sometimes referred to as a 'derived sounding interval.' This approach may allow the new sounding interval to be determined by interpolating between the discrete set of basic sounding intervals.

In some embodiments, the derived sounding interval is determined by calculating frequencies of rank positions for the set of basic sounding intervals based on an estimated throughput for the numbers of packets transmitted with TxBF for different basic sounding intervals out of a total number of packets transmitted (e.g., the number of times when TxBF is favorable, such as based on the estimated throughput, at the time when the sounding interval optimizer receives transmission statistics from the rate optimizer). For example, the frequencies may indicate how often a particular basic sounding interval is at the top of the ranking. Then, the derived sounding interval may be determined by computing a moment based on the calculated frequencies of the different basic sounding intervals in the set of basic sounding intervals. In particular, the moment may include the mean or the median. In this way, the electronic device may interpolate among the discrete sounding intervals in the set of basic sounding intervals.

In an exemplary embodiment, the estimated throughput is determined based on a physical data rate and the number of packets transmitted with TxBF out of a total number of packets transmitted for different basic sounding intervals. Then, basic sounding intervals are ranked relative to each other based on the associated ratios. These operations may be repeated multiple times to determine the frequencies of the rank positions (such as, for a given basic sounding interval, a $1^{st}$ rank position 25% of the time, a $2^{nd}$ rank position 15% of the time, etc.) for the different basic sounding intervals. In general, the sounding interval may be the largest value that maximizes the rank position the most often. However, this is a discrete approach for determining the sounding interval. Instead, in some embodiments the derived sounding interval is determined by calculating the moment (such as the mean or the median) using the rank positions and the associated frequencies for the different basic sounding intervals. For example, a first sounding interval may have the $1^{st}$ rank position 25% of the time, a second sounding interval may have the $1^{st}$ rank position 15% of the time, etc. In this way, the derived sounding interval may be weighted by the basic sounding intervals that produce the best throughput (the highest ratio for using TxBF or without using TxBF the most often).

After calculating the derived sounding interval, there may be N+1 sounding intervals. The electronic device may repeat at least some of the operations in the communication technique, but now the calculation of the next instance of the derived sounding interval may be based on basic sounding intervals and the previous instance of the derived sounding interval. In this way, the derived sounding interval may be iteratively or dynamically updated.

Ideally, after several iterations the derived sounding interval is an optimal one. More generally, the communication technique may be iterated until a convergence criterion is achieved, such as when a difference between the next instance of the derived sounding interval and an average of one or more of the previous instances of the derived sounding interval is less than 1, 3, 5 or 10% or when a confidence interval is at least 75%.

Figure 5:
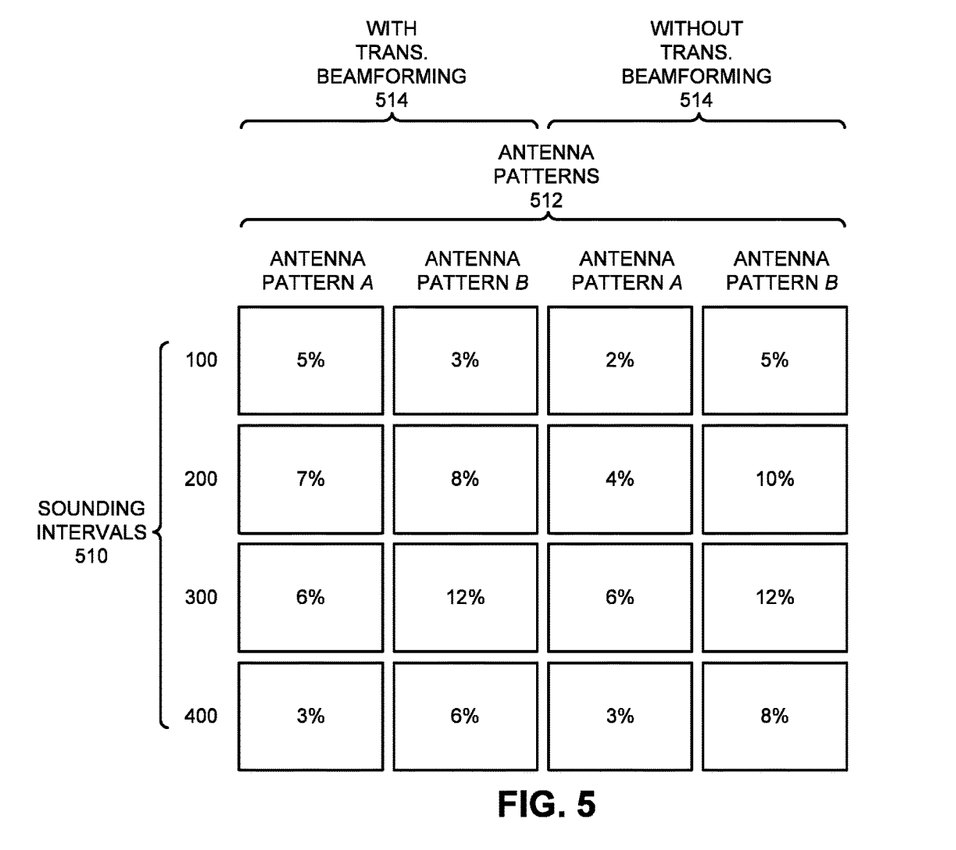
FIG. 5 is a drawing illustrating the determination of a sounding interval on a per-client basis in accordance with an embodiment of the present disclosure.

In an exemplary embodiment, while determining the sounding interval, the electronic device may update an antenna pattern that is used during transmission and/or receiving. For example, as shown in FIG. 5, on a per client basis, the electronic device may determine rankings based on transmission statistics for multiple predefined antenna patterns 510 at different sounding intervals 512. Although described as having two antenna patterns, there may be any number of antenna patterns. Moreover, Antenna patterns may be formed by shaping a radiation pattern from a radiating element by, for example, enabling and/or disabling reflectors and/or directors associated with a radiating element. In particular, the electronic device may tabulate a frequency of the top rank position of a performance metric, such as an estimated throughput (although, one or more other performance metrics may be used), for each of predefined antenna patterns 510 at each of the sounding intervals 512. Moreover, this tabulation may be performed for those packets communicated using transmission beamforming 514 and those packets communicated without transmission beamforming 516 at the different sounding intervals 512.

Then, the probability distribution for the throughput-based frequency rankings may be integrated to determine the cumulative distribution function. This cumulative distribution function may be used to select the sounding interval and the predefined antenna pattern with the highest throughput having a confidence interval that exceeds a threshold value (such as 50% or 75%). In general, for two or more sounding intervals having the same throughput and confidence interval, the electronic device will select the longest sounding interval as the sounding interval.

In some embodiments, during the communication technique, packets (which may be packets transmitted the normal course of operation or may be special types of packets) in a queue are transmitted using TxBF with a sounding interval of 50 ms and then 100 ms. The estimated throughput, respectively, may be 350 Mbps and 375 Mbps. Next, packets (which may be the same or different form the packets transmitted using TxBF) in the queue are transmitted without using TxBF (and, in some embodiments, there may or may not be a sounding interval), and the estimated throughput may be 425 Mbps. Finally, packets in the queue are transmitted using TxBF with a sounding interval of 200 ms, and the estimated throughput may be 500 Mbps. Based on these measurements, the sounding interval of 200 ms may have the $1^{st}$ rank position. These measurements may be repeated multiple times so that frequencies of the rank positions can be determined. Next, using the frequencies, the moment may be determined, which is then used to determine the new sounding interval.

Thus, not all the options (sounding intervals, with and without TxBF) may be used. Moreover, the decision regarding the best sounding interval may be jointly determined for TxBF and without TxBF. Furthermore, the resulting new sounding interval may be for TxBF or without TxBF depending on which one opportunistically maximizes the throughput and maximizes the sounding interval.

In these ways, the electronic device may dynamically determine a sounding interval that represents an optimal tradeoff between overhead and the signal-to-noise ratio. Moreover, the electronic device may be able to adapt to changes in the wireless environment, thereby providing improved communication performance.

We now describe embodiments of an electronic device, which may perform at least some of the operations in the communication technique. FIG. 6 presents a block diagram illustrating an electronic device 600 in accordance with some embodiments. This electronic device includes processing subsystem 610, memory subsystem 612, and networking subsystem 614. Processing subsystem 610 includes one or more devices configured to perform computational operations. For example, processing subsystem 610 can include one or more microprocessors, ASICs, microcontrollers, programmable-logic devices, and/or one or more digital signal processors (DSPs).

Memory subsystem 612 includes one or more devices (and, more generally, a non-transitory computer-readable storage medium) for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

Networking subsystem 614 includes one or more devices configured to couple to and communicate on a wired and/or wireless network (i.e., to perform network operations), including: control logic 616, an interface circuit 618 and one or more antennas 620 (or antenna elements). (While FIG. 6 includes one or more antennas 620, in some embodiments electronic device 600 includes one or more nodes, such as nodes 608, e.g., a pad, which can be coupled to the one or more antennas 620. Thus, electronic device 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, a transmit or receives antenna radiation pattern or antenna pattern of electronic device 600 may be adapted or changed using pattern shapers (such as reflectors) in one or more antennas 620 (or antenna elements), which can be independently and selectively electrically coupled to ground to steer the transmit antenna radiation pattern in different directions. Thus, if one or more antennas 620 includes N antenna-radiation-pattern shapers, the one or more antennas 620 may have $2^N$ different antennaradiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program module 622 is included in operating system 624 and/or control logic 616 is included in interface circuit 618.

While the preceding discussion used particular communication protocols as illustrative examples, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising a transceiver, wherein the transceiver comprises:

an interface circuit configured to communicate with at least another electronic device, wherein the transceiver is configured to:

initialize a set of potential sounding intervals, wherein a given potential sounding interval specifies how often transmission beamforming is updated using sounding packets;

communicate, for at least the other electronic device, first packets with and second packets without transmission beamforming for the set of potential sounding intervals, wherein an antenna pattern of the electronic device for use when communicating the first packets is updated;

receive transmission statistics for the communication with at least the other electronic device;

calculate rank positions for the set of potential sounding intervals based at least in part on a performance metric associated with the transmission statistics and numbers of packets transmitted with transmission beamforming for the set of potential sounding intervals out of a total number of packets transmitted;

determine an output sounding interval based at least in part on the calculated rank positions;

repeat the communicating, receiving, calculating and determining until a convergence criterion is achieved, wherein the convergence criterion corresponds to a difference in the output sounding interval determined in two or more instances of the repeating;

calculate frequencies, over multiple iterations, based at least in part on the rank positions for the set of potential sounding intervals;

determine, when the convergence criterion is achieved, a moment based at least in part on the calculated frequencies;

repeat the set of potential sounding intervals; and repeat, one or more times, the communicating, receiving, calculating, determining the output sounding interval, calculating the frequencies, and determining the moment based at least in part on the revised set of potential sounding intervals.

2. The electronic device of claim 1, wherein the moment comprises one of: a mean, and a median.

3. The electronic device of claim 1, wherein the transceiver is configured to exclude errors in the transmission statistics that are associated with effects other than transmission beamforming.

4. The electronic device of claim 1, wherein the transmission statistics comprise one or more of: transmission errors associated with noise, transmission errors associated with collisions and interference, and transmission errors associated with the antenna pattern.

5. The electronic device of claim 1, wherein the transmission statistics comprise at least two of: the total number of packets transmitted, the number of packets transmitted using transmission beamforming, and a number of packets transmitted without using transmission beamforming.

6. The electronic device of claim 1, wherein the transceiver comprises an antenna with multiple elements that, during the communication, provides the antenna pattern.

7. The electronic device of claim 1, wherein the transceiver comprises one of: an access point, and a cellular telephone.

8. The electronic device of claim 1, wherein the communication of the first packets and the second packets is compatible with an IEEE 802.11 standard.

9. A non-transitory computer-readable storage medium for use in conjunction with an electronic device, the computer-readable storage medium storing program instructions, wherein, when executed by the electronic device, the program instructions cause the electronic device to determine a sounding interval by performing one or more operations comprising:

initializing a set of potential sounding intervals, wherein a given potential sounding interval specifies how often transmission beamforming is updated using sounding packets;

communicating, for at least another electronic device, first packets with and second packets without transmission beamforming for the set of potential sounding intervals, wherein, during the communication, an antenna pattern of the electronic device for use when communicating the first packets is updated;

receiving transmission statistics for the communication with at least the other electronic device;

calculating rank positions for the set of potential sounding intervals based at least in part on a performance metric associated with the transmission statistics and numbers of packets transmitted with transmission beamforming for the set of potential sounding intervals out of a total number of packets transmitted;

determining an output sounding interval based at least in part on the calculated rank positions;

repeating the communicating, receiving, calculating, calculating and determining until a convergence criterion is achieved, wherein the convergence criterion corresponds to a difference in the output sounding interval determined in two or more instances of the repeating;

calculating frequencies, over multiple iterations, based at least in part on the rank positions for the set of potential sounding intervals;

determining, when the convergence criterion is achieved, a moment based at least in part on the calculated frequencies;

revising the set of potential sounding intervals; and repeating, one or more times, the communicating, receiving, calculating, determining the output sounding interval, calculating the frequencies, and determining the moment based at least in part on the revised set of potential sounding intervals.

10. The non-transitory computer-readable storage medium of claim 9, wherein the moment comprises one of: a mean, and a median.

11. The non-transitory computer-readable storage medium of claim 9, wherein the one or more operations comprise excluding errors in the transmission statistics that are associated with effects other than transmission beamforming.

12. The non-transitory computer-readable storage medium of claim 9, wherein the transmission statistics comprise one or more of: transmission errors associated with noise, transmission errors associated with collisions and interference, and transmission errors associated with the antenna pattern.

13. The non-transitory computer-readable storage medium of claim 9, wherein the transmission statistics comprise at least two of: the total number of packets transmitted, the number of packets transmitted using transmission beamforming, and a number of packets transmitted without using transmission beamforming.

14. The non-transitory computer-readable storage medium of claim 9, wherein the electronic device comprises one of: an access point, and a cellular telephone.

15. A method for determining a sounding interval, wherein the method comprises:

by an electronic device:

initializing a set of potential sounding intervals, wherein a given potential sounding interval specifies how often transmission beamforming is updated using sounding packets;

communicating, for at least another electronic device, first packets with and second packets without transmission beamforming for the set of potential sounding intervals, wherein, during the communication, an antenna pattern of the electronic device for use when communicating the first packets is updated;

receiving transmission statistics for the communication with at least the other electronic device;

calculating rank positions for the set of potential sounding intervals based at least in part on a performance metric associated with the transmission statistics and numbers of packets transmitted with transmission beamforming for the set of potential sounding intervals out of a total number of packets transmitted;

determining an output sounding interval based at least in part on the calculated rank positions;

repeating the communicating, receiving, calculating, and determining until a convergence criterion is achieved, wherein the convergence criterion corresponds to a difference in the output sounding interval determined in two or more instances of the repeating;

calculating frequencies, over multiple iterations, based at least in part on the rank positions for the set of potential sounding intervals;

determining, when the convergence criterion is achieved, a moment based at least in part on the calculated frequencies;

revising the set of potential sounding intervals; and repeating, one or more times, the communicating, receiving, calculating, determining the output sounding interval, calculating the frequencies, and determining the moment based at least in part on the revised set of potential sounding intervals.

16. The method of claim 15, wherein the moment comprises one of: a mean, and a median.

17. The method of claim 15, wherein the method further comprises excluding errors in the transmission statistics that are associated with effects other than transmission beamforming.

18. The method of claim 15, wherein the transmission statistics comprise one or more of: transmission errors associated with noise, transmission errors associated with collisions and interference, and transmission errors associated with the antenna pattern.

19. The method of claim 15, wherein the transmission statistics comprise at least two of: the total number of packets transmitted, the number of packets transmitted using transmission beamforming, and a number of packets transmitted without using transmission beamforming.

20. The method of claim 15, wherein the electronic device comprises one of: an access point, and a cellular telephone.

* * * * *